United States Patent Office 3,221,650
Patented Dec. 7, 1965

3,221,650
PLANOGRAPHIC PRINTING IMPROVEMENTS
Paul W. Greubel, Short Hills, N.J., assignor to Interchemical Corporation, New York, N.Y., a corporation of Ohio
No Drawing. Filed June 21, 1963, Ser. No. 289,742
4 Claims. (Cl. 101—149.2)

This invention relates to improvements in a new planographic printing process. My copending application S.N. 141,540, filed September 28, 1961, now U.S. Patent No. 3,167,005, the disclosure of which is herbey incorporated into the present application, relates to a new method of planographic printing which does not use the water fountain solution conventionally used in lithographic printing thereby permitting the use of inks other than oil inks, resin-hydrocarbon inks, or oleoresinous inks in planographic printing. The copending application describes a new planographic method of printing permitting the use of substantially odorless non-oily or non-oleoresinous inks. The novel process of this invention is based upon the mutual immiscibility between volatile aliphatic hydrocarbons and odorless non-oily or non-oleoresinous inks. This new planographic method employs a novel planographic plate descrbed in my copending application entitled, "A New Planographic Printing Plate and Method for Producing Same," S.N. 141,538, filed on September 28, 1961, in which plate the non-image areas are rendered retentive of the volatile aliphatic hydrocarbons by a coating of a silicone which covers the non-image areas. Using conventional lithographic equipment, a fountain solution consisting of the volatile aliphatic hydrocarbon is applied to the plate prior to the application of ink. When the ink is subsequently applied, it is prevented from depositing on the non-image areas by the aliphatic hydrocarbon covering such areas and the ink only deposits in the image areas which being exposed metal are preferentially wetted by the ink. The image thus formed is subsequently transferred either directly to the stock being printed, or, as in offset printing, to a rubber blanket from which it is then retransferred to the stock being printed.

This plate comprises a base metal plate suitably made of zinc having a printing surface on which the image areas are the exposed metal and the non-image areas are coated with a cured thermosetting silicone. Other conventional planographic plate metals such as aluminum may also be used for the base metal. The silicones preferably used to coat the non-image areas are thermosetting alkyl and aryl substituted polysiloxanes including thermosetting alkyl siloxanes such as dimethylpolysiloxane resin, thermosetting alkyl-aryl polysiloxanes, for example a methylphenylpolysiloxane having an average degree of substitution of 1.3 methyl and phenyl radicals per silicone atom. Very good results have been achieved with a thermosetting polysiloxane copolymer comprising 37% by weight of dimethylsiloxane units ($(CH_3)_2SiO$), 56% of phenyl siloxane units ($C_6H_5SiO_{1.5}$) and 7% methyl siloxane ($CH_3SiO_{1.5}$).

In the practice of the invention set forth in my application S.N. 141,540, preferably aliphatic hydrocarbons having a boiling range from 145° F. to 390° F. are used. The hydrocarbon can not be too volatile since this would cause the solvent applied to the plate to evaporate before the ink is applied. On the other hand, if the hydrocarbon evaporates too slowly, it is carried into the ink distribution system and affects the ink. Some commercially available aliphatic hydrocarbons which have been found to be suitable for this process are "Textile Spirits," an aliphatic hydrocarbon having a boiling range of 145°–175° F. and a KB value of 32.8, "Amsco Supernaphtholite," having a boiling range of 247°–287° F. and a KB value of 33.8; and "Varnolene," having a boiling range of 310°–380° F. and a KB value of 37.4.

Among the inks providing good results in the practice of the process described in application S.N. 141,540 are inks using glycol solvents. The lower glycols, pentanediol and below as well as glycol ethers have been found to be immiscible with the aliphatic hydrocarbons. The glycol inks utilizable in this process include inks having diethylene glycol, dipropylene glycol, propylene glycol, triethylene glycol, and 1,5 pentanediol as solvents. It should also be noted that the glycol inks have moisture setting properties. Application S.N. 141,540 also sets forth glycerine based inks as being suitable.

While the method of copending application S.N. 141,540 provides excellent printed matter, the plate life of the plates used in this method is shorter than would be desirable for many planographic printing operations. By plate life, I mean the number of printing impressions during which there is no significant ink pick-up in the non-image areas or on the other hand blinding or the exclusion of ink from image areas.

I have now discovered a novel method for increasing plate life in a method of planographic printing of the type described in S.N. 141,540 ten-fold or even more.

This is accomplished by using instead of the aliphatic hydrocarbon fountain solution, a fountain solution comprising higher alkyl phosphate esters particularly $C_8$ to $C_{18}$ alkyl phosphate esters dissolved in said aliphatic hydrocarbon. Very good results are achieved by using either mono-octyl acid orthophosphate (the monooctyl phosphate ester) or the phosphate esters of technical lauryl alcohol. Technical lauryl alcohol is predominantly lauryl alcohol or dodecanol with minor amounts of $C_{10}$ to $C_{18}$ straight chain alkanol having an even number of carbons including decanol, tetradecanol, hexadecanol and octadecanol.

In order to demonstrate the effectiveness of the improved fountain solution, the following experiments are carried out. (It is to be noted that in this application, all proportions are by weight unless otherwise stated.)

Example 1

Using a fountain solution of a volatile aliphatic hydrocarbon having a boiling range of 247° to 287° F. and a KB value of 33.8 and a printing ink of the following formula:

|  | Parts |
|---|---|
| Triethylene glycol | 57 |
| Zein | 15 |
| Carbon black pigment | 26 |
| Alkali blue pigment | 2 | planographic printing is conducted by the method and apparatus described in copending application S.N. 141,540. After about 2500 impressions, ink begins to appear on the non-image areas of the printed sheets indicating the exhaustion of the plate life.

Example 2

Example 1 is repeated using the same conditions, proportions and ingredients except that in place of the fountain solution of Example 1, there is used a fountain solution comprising a mixture of mono-alkyl and dialkyl phosphate esters of technical lauryl alcohol. (The technical lauryl alcohol contains 55.5% dodecanol, 2.5% decanol, 21.0% tetradecanol, 10.2% hexadecanol and 10.8% of octadecanol.) dissolved in the volatile aliphatic hydrocarbon having the boiling range of 247° F. to 287° F. and a KB value of 33.8, the phosphate esters comprising about 0.1% of the total fountain solution weight. The plate life is increased to 27,000 impressions.

Example 3

Example 1 is repeated using the same conditions proportions and ingredients except that in place of the fountain solution of Example 1, there is used a fountain solution comprising mono-octyl acid ortho phosphate dissolved in a volatile aliphatic hydrocarbon having the boiling range of 247° to 287° F. and a KB value of 33.8, the phosphate comprising 0.05% of the total fountain solution weight. The plate life is increased to 40,000 impressions.

Example 4

Example 2 is repeated using the same proportions, ingredients and conditions except that the phosphate esters comprise 0.05% of the total fountain solution weight. The plate life is increased to 40,000 impressions.

Example 5

Example 2 is repeated using the same proportions, ingredients and conditions except that the phosphate esters comprise 0.025% of the total fountain solution weight. The plate life is about 40,000 impressions.

I have found it to be preferable for the phosphate esters to constitute from 0.01% to 4% of the total fountain solution weight. For best results the phosphate esters should constitute from 0.025% to 0.1% of the total fountain solution weight.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A method of planographic printing comprising applying a fountain solution comprising a solution in a volatile aliphatic hydrocarbon having a boiling range within the limits of 145°–390° F. of a phosphate ester ingredient selected from the group consisting of
    (1) mono-octyl phosphate and
    (2) a mixture of mono-alkyl and di-alkyl phosphate esters, said alkyls comprising a plurality of members selected from the group consisting of decyl, dodecyl, tetradecyl, hexadecyl and octadecyl with said dodecyl member predominating, said phosphate ester comprising from 0.01% to 4% of the fountain solution weight, to a lithographic printing plate, the non-image areas of which are covered with a cured coating comprising a thermosetting silicone resin, applying to the plate an ink having a solvent selected from the group consisting of alkandiols having from 2 to 5 carbon atoms, diethylene glycol, dipropylene glycol, triethylene glycol and glycerin, said inks being immiscible with said volatile aliphatic hydrocarbon fountain solution, printing successive copies of the image with said ink and reapplying said fountain solution between successive printings.

2. The method of claim 1 wherein said phosphate ester ingredient is mono-octyl phosphate.

3. The method of claim 1 wherein said phosphate ester ingredient is a mixture of mono-alkyl and di-alkyl phosphate esters, said alkyls comprising a plurality of members selected from the group consisting of decyl, dodecyl, tetradecyl, hexadecyl and octadecyl with said dodecyl member predominating.

4. The method of claim 1 wherein the phosphate esters comprise from 0.025% to 0.1% of the fountain solution weight.

References Cited by the Examiner
UNITED STATES PATENTS 2,285,855   6/1942   Downing et al. ___ 260—461.313

DAVID KLEIN, *Primary Examiner.*